(12) United States Patent
Baldys et al.

(10) Patent No.: US 10,076,989 B2
(45) Date of Patent: Sep. 18, 2018

(54) METHOD AND SYSTEM FOR OPERATING A TIPPER

(71) Applicant: HYVA HOLDING B.V., Alphen aan den Rijn (NL)

(72) Inventors: Marek Baldys, Amsterdam (NL); Maarten Hertog, Utrecht (NL); Jacob Biemond, Bodegraven (NL)

(73) Assignee: HYVA HOLDING B.V., Alphen aan Rijn (NL)

( * ) Notice: Subject to any disclaimer, the term of this patent is extended or adjusted under 35 U.S.C. 154(b) by 180 days.

(21) Appl. No.: 15/061,495

(22) Filed: Mar. 4, 2016

(65) Prior Publication Data

US 2017/0021751 A1 Jan. 26, 2017

(30) Foreign Application Priority Data

Mar. 6, 2015 (GB) .................................. 1503871.4
Feb. 26, 2016 (GB) .................................. 1603356.5

(51) Int. Cl.
*B60P 1/16* (2006.01)
*B60P 1/04* (2006.01)
*F15B 15/20* (2006.01)

(52) U.S. Cl.
CPC .............. *B60P 1/162* (2013.01); *B60P 1/045* (2013.01); *F15B 15/20* (2013.01)

(58) Field of Classification Search
CPC ........... B60P 1/162; B60P 1/045; F16B 15/20
USPC ...................................................... 298/22 C
See application file for complete search history.

(56) References Cited

U.S. PATENT DOCUMENTS

| 3,640,578 | A | * | 2/1972 | Finney | ................. | B60G 17/005 |
| | | | | | | 298/17 S |
| 3,921,128 | A | * | 11/1975 | Snead | ..................... | B60P 1/045 |
| | | | | | | 180/282 |
| 4,216,996 | A | * | 8/1980 | Pitts | ........................ | B60P 1/045 |
| | | | | | | 188/29 |
| 4,682,145 | A | * | 7/1987 | Brawner, Jr. | ............ | G01C 9/14 |
| | | | | | | 180/282 |
| 4,988,974 | A | | 1/1991 | Fury et al. | | |

(Continued)

FOREIGN PATENT DOCUMENTS

| AU | 2009100034 A4 | 2/2009 |
| DE | 102013202415 A1 | 8/2014 |
| EP | 2364877 A1 | 9/2011 |

(Continued)

OTHER PUBLICATIONS

GB Search Report dated Jun. 21, 2016 for GB1503871.4.

(Continued)

*Primary Examiner* — Hilary L Gutman
(74) *Attorney, Agent, or Firm* — Brooks Kushman P.C.

(57) ABSTRACT

There is disclosed a method of operating a tipper comprising a tipper body pivotably moveable with respect to a frame with a hydraulic cylinder disposed therebetween and actuatable to pivot the tipper body. The method comprises receiving at least one lateral state parameter relating to at least one lateral state of the hydraulic cylinder; determining whether the lateral condition of the hydraulic cylinder is outside acceptable limits based on the at least one lateral state parameter; and generating an output if it is determined that the lateral condition of the hydraulic cylinder is outside acceptable limits.

18 Claims, 8 Drawing Sheets

(56) References Cited

U.S. PATENT DOCUMENTS

2011/0198912 A1  8/2011  Bibeau

FOREIGN PATENT DOCUMENTS

| GB | 2046957 A | 11/1980 |
| GB | 2169565 A | 7/1986 |
| GB | 2497134 A | 6/2013 |
| JP | 2009262750 A | 11/2009 |
| JP | 2013169931 A | 9/2013 |
| WO | 8702128 A1 | 4/1987 |

OTHER PUBLICATIONS

EP Search Report dated Jul. 15, 2016 for EP16157742.4.
EP Search Report dated Jul. 15, 2016 for EP16157743.2.
GB Search Report dated Sep. 14, 2015 for GB1503871.4.

\* cited by examiner

METHOD AND SYSTEM FOR OPERATING A TIPPER

CROSS-REFERENCE TO RELATED APPLICATIONS

This application claims foreign priority benefits under 35 U.S.C. § 119 to GB 1503871.4 filed on 6 Mar. 2015 and to GB 1603356.5 filed on 26 Feb. 2016, which are hereby incorporated by reference in their entirety for any and all purposes.

BACKGROUND

The invention relates to a method and system for operating a tipper. In particular, the invention relates to a method and system in which it is determined whether the lateral state of a hydraulic cylinder of the tipper is outside acceptable limits.

A tipper truck, sometimes referred to as a dump or dumper truck, is a vehicle that is typically used in the construction industry for transporting aggregate (e.g. gravel or sand). The tipper typically comprises an engine, a driver cab and a trailer. The trailer usually has a trailer chassis or frame with a tipper body, in the form of an open-top cuboidal container, pivotably mounted thereto. A hydraulic cylinder is provided between the frame and the tipper body and can be extended to pivot the tipper body to a tipping position in which the load is emptied from the body. The cylinder can be retracted to lower the tipper body. It should be appreciated that this is merely one form of tipper truck and other types do exist.

Tipper trucks are often used off-road on construction sites or the like where the ground may be uneven. If the chassis or frame of the truck is inclined sideways (i.e. the wheel on one side is higher than the wheel on the opposite side) then the hydraulic cylinder will also be inclined sideways (i.e. laterally). Thus, as the hydraulic cylinder is extended, the centre of gravity of the load within the tipper body will move sideways. This may cause the tipper truck to topple over, and/or the hydraulic cylinder may buckle. This is clearly highly undesirable. Operators are therefore typically instructed not to raise the tipper body unless the truck is substantially horizontal. However, it may not always be apparent to the operator that the truck is not horizontal, especially if only one rear wheel, for example, is raised.

It is therefore desirable to provide a method and system which addresses this problem to at least some extent.

SUMMARY

According to an aspect there is provided a method of operating a tipper comprising a tipper body pivotably moveable with respect to a frame with a hydraulic cylinder disposed therebetween and actuatable to pivot the tipper body, the method comprising: receiving at least one lateral state parameter relating to at least one lateral state of the hydraulic cylinder; determining whether the lateral condition of the hydraulic cylinder is outside acceptable limits based on the at least one lateral state parameter; and generating an output if it is determined that the lateral condition of the hydraulic cylinder is outside acceptable limits. The term "lateral" should be understood to mean sideways or transverse. The lateral state could include sideways bending and/or sideways inclination. If either of these are excessive then this may cause the tipper to either tip over sideways and/or the cylinder may buckle. It is important for safety reasons that this is avoided.

A lateral inclination parameter may be received which relates to the lateral inclination of the hydraulic cylinder. It may be determined whether the lateral condition of the hydraulic cylinder is outside acceptable limits based on at least the lateral inclination parameter. The lateral inclination parameter may be generated by an inclination sensor arranged to measure the lateral inclination of the hydraulic cylinder. The inclination sensor may be mounted to the hydraulic cylinder. The lateral inclination parameter may be generated by an inclination sensor arranged to measure the lateral inclination of the tipper body. The inclination sensor may be mounted to the tipper body. In other embodiments, an inclination sensor could be attached to the chassis or frame of the vehicle to measure the sideways tilt or inclination of the chassis, which also relates to the lateral inclination of the cylinder. Thus, the output of the inclination sensor attached to the chassis can be considered to be a lateral inclination parameter since it indirectly relates to the lateral inclination of the cylinder. The inclination (or tilt) sensor may be electronic and may be arranged to generate an electronic signal, the value of which is related to the lateral inclination of the cylinder. The inclination sensor may measure the inclination of the hydraulic cylinder or the tipper body in a plane perpendicular to the pivot axis of the cylinder (i.e. the fore-aft inclination).

A lateral bending parameter may be received which relates to the lateral bending of the hydraulic cylinder. It may be determined whether the lateral condition of the hydraulic cylinder is outside acceptable limits based on at least the lateral bending parameter. The lateral bending parameter may be generated by at least one bending sensor arranged to measure the lateral bending of the hydraulic cylinder. The bending sensor may be mounted to the hydraulic cylinder. First and second bending sensors may be mounted either side of the hydraulic cylinder. The or each bending sensor may comprise a strain gauge. A number of bending sensors, such as strain gauges, could be attached to the cylinder along its length to measure the bending at different positions. The bending sensor(s) may be electronic and may be arranged to generate an electronic signal, the value of which is related to the bending of the cylinder.

The method may further comprise receiving an angular positional parameter relating to the tip angle of the tipper body. It may be determined whether the lateral condition of the hydraulic cylinder is outside acceptable limits based on the at least one lateral state parameter and the angular positional parameter. The term "angular positional parameter" covers any measurable parameter from which the angular position and/or tip angle of the tipper body can be determined. Thus the angular positional parameter does not have to be generated by directly measuring the angular position of the tipper body. For example, the angular positional parameter could be generated by measuring another factor such as the inclination angle of the hydraulic cylinder, the length of the hydraulic cylinder, or the vertical distance between the frame and the lower surface of the tipper body.

The angular positional parameter may be generated by an inclination sensor. The inclination sensor may measure the inclination of the hydraulic cylinder. The angular positional parameter may be generated by a rotary position sensor. The rotary position sensor may measure the angular position of the hydraulic cylinder about a pivot axis of the hydraulic cylinder. The rotary position sensor may measure the angular position of the tipper body about the pivot axis of the hydraulic cylinder. The position sensor, such an inclination (or tilt) sensor or a rotary position sensor, may be electronic and may be arranged to generate an electronic signal, the value of which is related to the angular position of the tipper body.

The method may further comprise receiving a pressure parameter relating to the hydraulic pressure within the hydraulic cylinder. It may be determined whether the lateral condition of the hydraulic cylinder is outside acceptable limits based on the at least one lateral state parameter and the pressure parameter. The pressure parameter may be generated by a pressure sensor which measures the hydraulic pressure within the hydraulic cylinder. The pressure sensor may be mounted to the hydraulic cylinder. The term "pressure parameter" covers any measurable parameter from which the pressure of the hydraulic fluid within the hydraulic cylinder can be determined.

Determining whether the lateral condition of the hydraulic cylinder is outside acceptable limits may comprise comparing at least one lateral state parameter with reference data. The comparison may be a direct comparison or an indirect comparison. For example, the parameter could be converted into another form before comparison. Determining whether the lateral condition of the hydraulic cylinder is outside acceptable limits may comprise utilising an algorithm which considers at least two different types of lateral state parameter. In one embodiment, there may be two lateral state parameters (e.g. bending and inclination) and if either of these are above a threshold then it may be determined that the lateral condition of the cylinder is outside acceptable limits.

The method may further comprise generating an alert if it is determined that the lateral condition of the hydraulic cylinder is outside acceptable limits. The alert may comprise a visual and/or an audible alert.

The method may further comprise preventing a tipping operation from being performed if it is determined that the lateral condition of the hydraulic cylinder is outside acceptable limits. The method may further comprise automatically halting a tipping operation if it is determined that the lateral condition of the hydraulic cylinder is outside acceptable limits. The method may further comprise automatically returning the tipper body to a resting position if it is determined that the lateral condition of the hydraulic cylinder is outside acceptable limits.

According to another aspect there is provided a system for a tipper comprising a tipper body pivotably moveable with respect to a frame with a hydraulic cylinder disposed therebetween and actuatable to pivot the tipper body, the system comprising: a lateral condition determining module arranged to: receive at least one lateral state parameter relating to at least one lateral state of the hydraulic cylinder; determine whether the lateral condition of the hydraulic cylinder is outside acceptable limits based on the at least one lateral state parameter; and generate an output if it is determined that the lateral condition of the hydraulic cylinder is outside acceptable limits.

The lateral condition determining module may be arranged to: receive a lateral inclination parameter relating to the lateral inclination of the hydraulic cylinder, and determine whether the lateral condition of the hydraulic cylinder is outside acceptable limits based on at least the lateral inclination parameter. The system may further comprise an inclination sensor arranged to measure the lateral inclination of the hydraulic cylinder and generate the lateral inclination parameter. The system may further comprise an inclination sensor arranged to measure the lateral inclination of the tipper body and generate the lateral inclination parameter.

The lateral condition determining module may be arranged to: receive a lateral bending parameter relating to the lateral bending of the hydraulic cylinder, and determine whether the lateral condition of the hydraulic cylinder is outside acceptable limits based on at least the lateral bending parameter. The system may further comprise at least one bending sensor arranged to measure the lateral bending of the hydraulic cylinder and generate the lateral bending parameter. The system may comprise first and second bending sensors arranged to be mounted either side of the hydraulic cylinder. The or each bending sensor may comprise a strain gauge.

The lateral condition determining module may be arranged to: receive an angular positional parameter relating to the tip angle of the tipper body; and determine whether the lateral condition of the hydraulic cylinder is outside acceptable limits based on the at least one lateral state parameter and the angular positional parameter. The system may further comprise an inclination sensor arranged to generate the angular positional parameter. The inclination sensor may be arranged to measure the inclination of the hydraulic cylinder. The inclination sensor may be arranged to measure the inclination of the tipper body. The system may further comprise a rotary position sensor arranged to generate the angular positional parameter. The rotary position sensor may be arranged to measure the angular position of the hydraulic cylinder about a pivot axis of the hydraulic cylinder. The rotary position sensor may be arranged to measure the angular position of the tipper body about the pivot axis of the hydraulic cylinder.

The lateral condition determining module may be arranged to: receive a pressure parameter relating to the hydraulic pressure within the hydraulic cylinder; and determine whether the lateral condition of the hydraulic cylinder is outside acceptable limits based on the at least one lateral state parameter and the pressure parameter. The system may further comprise a pressure sensor which is arranged to measure the hydraulic pressure within the hydraulic cylinder and generate the pressure parameter.

The system may further comprise a storage module storing reference data. The lateral condition determining module may be arranged to determine whether the lateral condition of the hydraulic cylinder is outside acceptable limits by comparing at least one lateral state parameter with reference data stored in the storage module. The lateral condition determining module may be arranged to determine whether the lateral condition of the hydraulic cylinder is outside acceptable limits by utilising an algorithm which considers at least two different types of lateral state parameter.

The system may further comprise an alert generator arranged to generate an alert if it is determined that the lateral condition of the hydraulic cylinder is outside acceptable limits. The alert generator may comprise a visual and/or an audible alert generator.

The system may further comprise a cylinder control module arranged to prevent a tipping operation from being performed if it is determined that the lateral condition of the hydraulic cylinder is outside acceptable limits. The system may further comprise a cylinder control module arranged to automatically halt a tipping operation if it is determined that the lateral condition of the hydraulic cylinder is outside acceptable limits. The system may further comprise a cylinder control module arranged to automatically return the tipper body to a resting position if it is determined that the lateral condition of the hydraulic cylinder is outside acceptable limits.

According to a further aspect there is provided a tipper comprising: a tipper body pivotably moveable with respect to a frame; a hydraulic cylinder disposed between the frame and the tipper body and actuatable to pivot the tipper body; and a system in accordance with any statement herein. The inclination sensor may be mounted to the hydraulic cylinder. The inclination sensor may be mounted to the tipper body. The bending sensor may be mounted to the hydraulic cylinder. The first and second bending sensors may be mounted either side of the hydraulic cylinder. The tipper may be a tipper vehicle. The pressure sensor may be mounted to the hydraulic cylinder.

According to yet a further aspect there is provided a hydraulic cylinder assembly comprising: a hydraulic cylinder having at least one pivot axis perpendicular to the longitudinal axis of the cylinder; and one or more of the following:
(i) at least one inclination sensor coupled to the hydraulic cylinder such that it is capable of generating a lateral inclination parameter relating to the inclination of the cylinder in a plane parallel to the pivot axis; and/or
(ii) at least one inclination sensor coupled to the hydraulic cylinder such that it is capable of generating a fore-aft inclination parameter relating to the inclination of the cylinder in a plane perpendicular to the pivot axis; and/or
(iii) at least one bending sensor coupled to the hydraulic cylinder such that it is capable of generating a lateral bending parameter relating to the inclination of the cylinder in a plane parallel to the pivot axis and the longitudinal axis.

First and second bending sensors may be mounted either side of the hydraulic cylinder. The or each bending sensor may comprise a strain gauge. At least one end of the hydraulic cylinder may be provided with an eye which defines the pivot axis.

The invention may comprise any combination of the features and/or limitations referred to herein, except combinations of such features as are mutually exclusive.

BRIEF DESCRIPTION OF THE DRAWINGS

Embodiments of the invention will now be described, by way of example, with reference to the accompanying drawings, in which.

DETAILED DESCRIPTION

Figure 1:
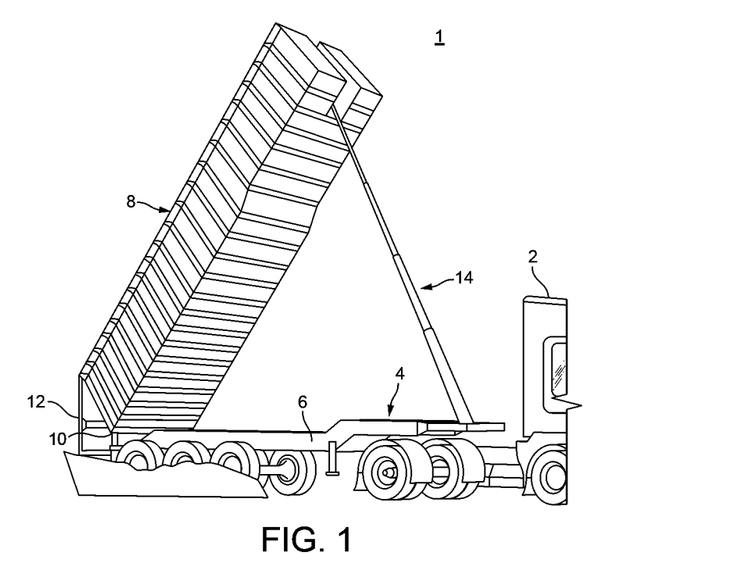
FIG. 1 schematically shows a perspective view of a tipper truck.
Figure 2:
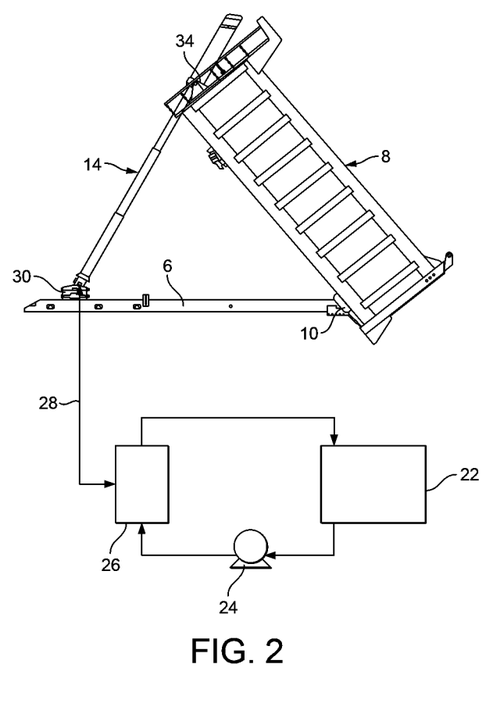
FIG. 2 schematically shows a side view of the tipper truck of FIG. 1 without the tractor.

FIGS. 1 and 2 show a tipper truck 1, sometimes referred to as a dump truck, comprising a tractor 2 and a trailer 4. The trailer 4 has a trailer chassis or frame 6, and a tipper body 8 is pivotably mounted thereto. The tipper body 8 is pivotably mounted to the chassis 6 about a transverse axis 10 that is located at the rear of the chassis 6. The tipper body 8 is in the form of a cuboidal container having an open top. The rear panel (or door) 12 of the tipper body 8 is hinged at its upper edge and can be locked and unlocked such that it can be opened to allow the contents of the tipper body 8 to be emptied. A hydraulic cylinder 14 is provided that is pivotably attached at a lower end to the front of the chassis 6 and pivotably attached an upper end to the front of the tipper body 8. The hydraulic cylinder 14 can be extended (as in FIG. 1) to pivot the tipper body 8 about the axis 10 to a fully tipped position in which, with the rear panel 12 unlocked, any load within the tipper body 8 is emptied onto the ground. The tipper body 8 can be lowered back to the resting position under its own weight, thereby causing the cylinder 14 to retract.

The tipper truck 1 further comprises a hydraulic actuation system 20 for actuating the hydraulic cylinder 14. The hydraulic actuation system 20 comprises an oil tank 22, a pump 24 and a valve assembly 26 that are connected with fluid lines to form a fluid circuit. A pilot system (not shown) is also provided for switching the valve assembly 26 between various configurations. The valve assembly 26 is provided with a port that is hydraulically connected to the hydraulic cylinder 14 with a fluid line 28. The valve assembly 26 can be switched between a number of configurations in order to operate the hydraulic cylinder 14. In a bypass configuration of the valve assembly 26, with the pump 24 running, hydraulic fluid is circulated by the pump 24 from the tank 22, through the valve assembly 26 back to the tank 22. In order to extend the hydraulic cylinder 14 to pivot the tipper body 8 to a fully tipped position (as in FIGS. 1 and 2), the valve assembly 26 is switched to a raising configuration in which the pump 24 pumps hydraulic fluid from the tank 22 into the hydraulic cylinder 14, thus causing it to extend. When the hydraulic cylinder 14 has been sufficiently extended (either fully extended or extended by the desired amount), the valve assembly 26 is returned to a bypass configuration in which, with the pump 24 running, hydraulic fluid is circulated from the tank 22 through the valve assembly 26 back to the tank 22. In the bypass configuration of the valve assembly 26 the fluid line 28 is closed and therefore the cylinder 14 remains in the extended configuration. In this embodiment, the hydraulic actuation system 20 is provided with an automatic knock-off which automatically switches the valve assembly 26 to the bypass configuration when the hydraulic cylinder has been fully extended. The automatic knock-off is in the form of a switch which the body of the hydraulic cylinder 14 triggers when it reaches the fully extended position. The valve assembly 26 is also provided with a pressure relief bypass valve. If the pressure of the hydraulic fluid in the valve assembly 26 has reached a threshold (which may be due to an excessively heavy load in the tipper body 8) the hydraulic fluid is diverted to the tank 22, rather than being pumped into the hydraulic cylinder 14. This is a safety feature provided to prevent excessively heavy loads from being lifted. In order to lower the hydraulic cylinder 14, the pump 24 is shut off and the valve assembly 26 is switched to a lowering configuration. In this configuration, the fluid line 28 is opened and the cylinder 14 retracts under the weight of the tipper body 8 with the hydraulic fluid being returned to the tank 22.

Figure 3:
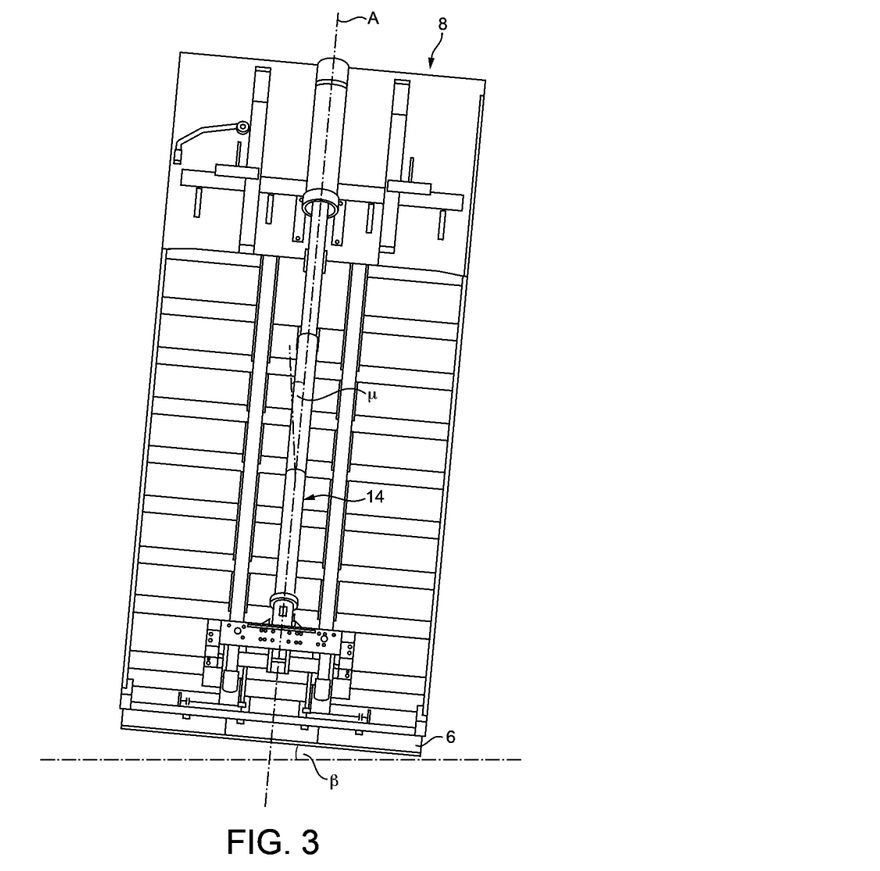
FIG. 3 schematically shows an end view of the tipper truck of FIG. 1 without the tractor and with the chassis inclined sideways.

Referring to FIG. 3, if the ground is uneven, the chassis 6 may be inclined sideways at an angle β (i.e. one side of the chassis 6 may be higher than the other side of the chassis 6).

If there is a sideways inclination of the chassis 6 then the longitudinal axis A of the hydraulic cylinder 14 will be also be laterally inclined by an angle μ (i.e. the longitudinal axis A of the hydraulic cylinder will have a transverse component). In this embodiment the inclination angle μ is defined with reference to vertical. However, the inclination angle could be defined with reference to horizontal (i.e. 90° equates to the cylinder 14 being vertical). With the chassis 6 inclined sideways, the centre of gravity of the load will move laterally as the hydraulic cylinder 14 is extended. This may cause the tipper truck 1 to topple over sideways, or it may cause the hydraulic cylinder 14 to bend and potentially buckle, which in turn may cause the tipper truck 1 to topple over sideways. Further, if the load within the tipper body 8 is not located laterally centrally then the hydraulic cylinder 14 may bend as it is extended, which may cause the cylinder 14 to buckle and the tipper truck 1 to topple.

As will be described in detail below, the tipper truck 1 is provided with a lateral condition determining system 40 which can determine whether the lateral condition of the hydraulic cylinder 14 falls outside acceptable limits.

Figure 4:
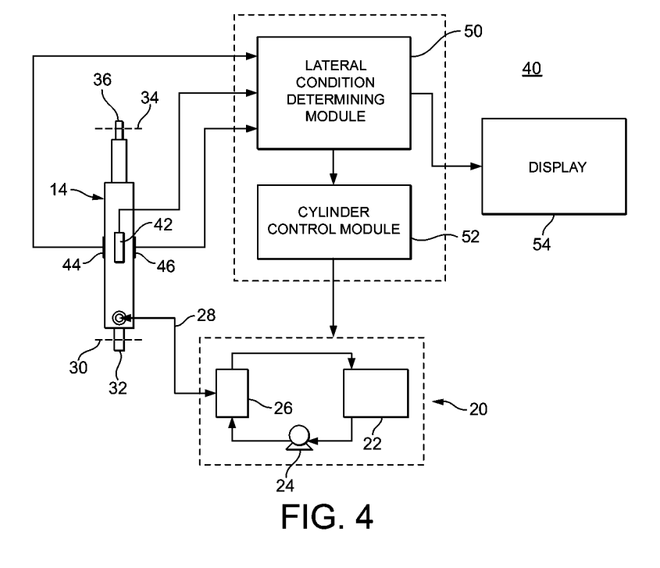
FIG. 4 schematically shows a first embodiment of a lateral condition determining system for determining the lateral condition of the hydraulic cylinder.

FIG. 4 shows the lateral condition determining system 40 for determining whether the lateral condition of the hydraulic cylinder falls outside acceptable limits based on two lateral states: lateral inclination and lateral bending. In this embodiment the lateral condition of the cylinder is a combination of lateral inclination and lateral bending of the cylinder 14. However, it should be appreciated that in other embodiments the lateral condition may include other factors, or may relate to only one condition (e.g. lateral inclination). The lateral condition determining system 40 comprises an inclination (or tilt) sensor 42 for measuring the inclination (i.e. the tilt angle) of the hydraulic cylinder 14 in a plane parallel to the lower pivot axis 30. The lower pivot axis 30 of the cylinder 14 is defined by the axis of the eye 32 by which the cylinder 14 is pivotably mounted to the chassis 6. Similarly, the upper pivot axis 34 (which is parallel to the lower axis 30) is defined by the axis of the eye 36 by which the cylinder 14 is pivotably mounted to the tipper body 8. The inclination sensor 42 is mounted to the outer surface of the hydraulic cylinder 14 and is positioned such that it can measure the lateral (i.e. sideways) inclination of the hydraulic cylinder 14 in a vertical plane parallel to the pivot axis 30. The inclination sensor 42 is arranged to generate an electronic signal which is representative of the inclination angle μ. The lateral condition determining system 40 also comprises first and second bending sensors 44, 46 in the form of strain gauges. The strain gauges 44, 46 are bonded to the hydraulic cylinder 14 and are located on opposing sides. The strain gauges 44, 46 are arranged to generate electronic signals which are representative of the lateral bending force experienced by the hydraulic cylinder 14 in a plane parallel to both the pivot axis 30 and the longitudinal axis of the cylinder 14. It should be appreciated that other bending sensors located in other suitable positions could be used. For example, one or more strain gauges could be bounded to the inside of a trunnion pin that passes through the eye 32 to provide a signal representative of bending. In another arrangement strain gauges could be bonded to the chassis bracket (not shown) which the trunnion pin passes through to provide a signal representative of bending.

The lateral condition determining system 40 further comprises a lateral condition determining module 50, a cylinder control module 52 and a display 54. The inclination sensor 42 and the first and second bending sensors 44, 46 are connected to the lateral condition determining module 50 by appropriate cabling such that the lateral condition determining module 50 can obtain the signals generated by the sensors 42, 44, 46. It should be appreciated that in other embodiments the sensors 42, 44, 46 could be wirelessly connected to the lateral condition determining module 50. The lateral condition determining module 50 is configured to monitor the signals received from the inclination sensor 42 and the two bending sensors 44, 46, and based on these signals, determine whether the lateral condition of the hydraulic cylinder 14 is outside of acceptable limits (i.e. if the angle of lateral inclination μ is excessive, or if the lateral bending is excessive, or if the combination of lateral inclination and lateral bending is excessive). The cylinder control module 52 is coupled to the hydraulic actuation system 20 of the tipper truck 1 (via the pilot system) so that it can automatically prevent the hydraulic cylinder 14 from being extended if it is determined that the lateral condition of the hydraulic cylinder 14 is unacceptable. The cylinder control module 52 is also capable of automatically actuating the hydraulic cylinder 14 to halt (or stop) the movement of the tipper body 8 if is determined that the lateral condition of the hydraulic cylinder 14 is unacceptable. In other embodiments, the cylinder control module 52 may be arranged to automatically actuate the hydraulic cylinder 14 to return the tipper body 8 to the resting position if it is determined that the lateral condition of the hydraulic cylinder 14 is unacceptable. The cylinder control module 52 may be connected either wired or wirelessly to the hydraulic actuation system 20 to control the pump 24 and/or the valve assembly 26 via the pilot system. The display 54 is connected to the lateral condition determining module 50 and is configured to display an alert if the lateral condition determining module 50 determines that the lateral condition of the hydraulic cylinder 14 is unacceptable. The display 54 is an LCD screen configured to display a visual alert, and a sounder is also provided to generate an audible alert. In this embodiment the display 54 is installed in the dashboard of the tractor 2 such that it is easily visible by an operator. However, in other embodiments it could be located externally, or it could be in the form of a wireless hand-held device (e.g. a smartphone or a tablet). If the display 54 is provided by a portable wireless device, such as a smartphone or tablet, it could also incorporate the lateral condition determining module 50 and the cylinder control module 52 and could communicate wirelessly with the sensors 42, 44, 46. It should be appreciated that other displays, such as an LED could be used to provide a warning.

The operation of the tipper 1 will now be described with reference to FIGS. 5 and 6.

Figure 5:
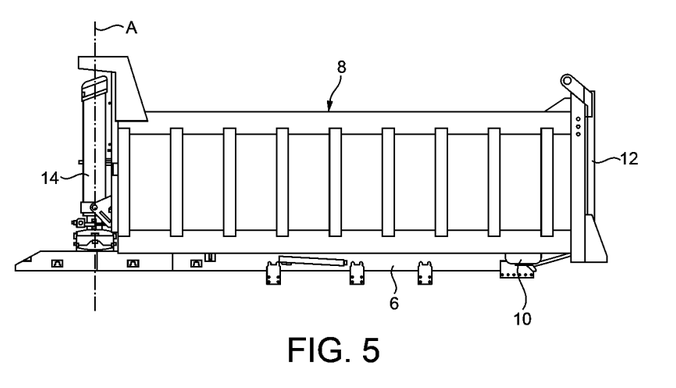
FIG. 5 schematically shows a side view of the tipper truck with the tipper body in a resting position.
Figure 6:
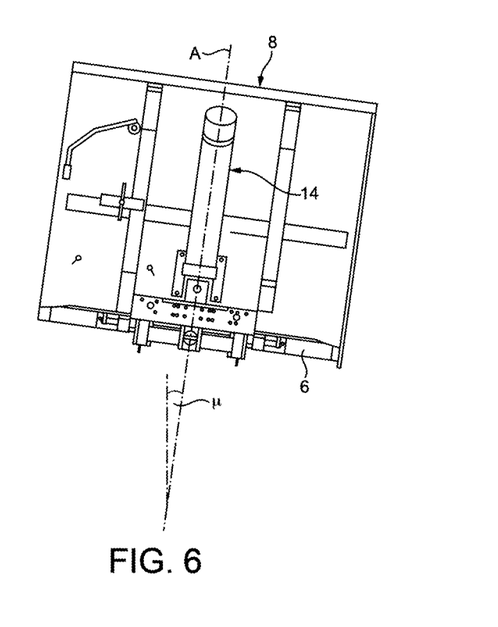
FIG. 6 schematically shows a front end view of the tipper truck with the tipper body in a resting position.

Before commencing a tipping operation, the tipper body 8 containing a load 16 (such as sand) is in a resting position (FIG. 5). In the resting position of the tipper body 8 it rests on the chassis 6 of the trailer 4 such that the load is transferred directly to the chassis 6. In order to commence a tipping operation in which the load 16 within the tipper body 8 is progressively emptied, an operator uses a control lever (not shown) of the hydraulic actuation system 20 to extend the hydraulic cylinder 14. The lateral condition determining system 40 continuously monitors the signals received from the inclination sensor 42 and the bending sensors 44, 46 to determine if the lateral condition of the hydraulic cylinder 14 is within acceptable limits. Specifically, the lateral condition determining module 50 continuously monitors the value of the inclination signal generated by the inclination sensor 42 (lateral inclination parameter) and the values of the bending signals generated by the first and second bending sensors 44, 46 (lateral bending parameter). The value of the inclination signal relates to the lateral (sideways) inclination angle µ of the hydraulic cylinder 14, whilst the value of the bending signals can be converted to a lateral bending moment experienced by the hydraulic cylinder 14. These values could be displayed on the display 56, but this is not essential. The lateral condition determining module 50 analyses the inclination signal and the bending signals and utilises an algorithm to determine whether the lateral condition of the hydraulic cylinder 14 is within or outside acceptable limits. In this embodiment, this is done by the lateral condition determining module 50 determining (a) whether the lateral inclination angle µ of the cylinder 14 is at or above a threshold (i.e. is the angle excessive), or (b) whether the lateral bending of the cylinder is at or above a threshold (i.e. is the bending excessive). If either of these thresholds are exceeded (i.e. if either the angle or the bending is excessive), then the lateral condition determining module 50 determines that the lateral condition of the hydraulic cylinder 14 is unacceptable (i.e. it is outside of acceptable limits). In response to this determination, the lateral condition determining module 50 communicates to the cylinder control module 52 which prevents the hydraulic cylinder 14 from being extended. In other words, if the operator attempts to use the control lever (not shown) to extend the cylinder 14 then nothing happens. Further, the display 54 generates a visual alert and an audible sound which indicates to the operator that the lateral condition of the cylinder 14 is outside of acceptable limits. This prevents the operator from extending the hydraulic cylinder 14, which could otherwise cause the tipper 1 to topple over and/or the cylinder 14 to buckle. Further, in response to the visual warning the operator can drive the tipper 1 to a more appropriate location where the ground is more level.

The lateral condition determining system 40 continuously monitors the signals generated by the sensors 42, 44, 46 and the lateral condition determining module 50 continuously assesses whether the lateral condition of the hydraulic cylinder 14 is outside acceptable limits. Specifically, even after a tipping operation has been commenced (i.e. when the tipper body 8 is pivoted away from the resting position), the lateral condition determining module 50 checks to ascertain whether the lateral inclination angle µ is excessive, or if the lateral bending is excessive. If it is ascertained that either of these parameters are outside acceptable limits, the cylinder control module 52 automatically halts (stops) the tipping operation and the hydraulic cylinder 14 is retracted to lower the tipper body 8 to the resting position. The display 54 also generates a visual and an audible alert. Again, this prevents the hydraulic cylinder 14 from buckling and/or the tipper 1 from toppling, providing a major safety benefit.

Figure 7:
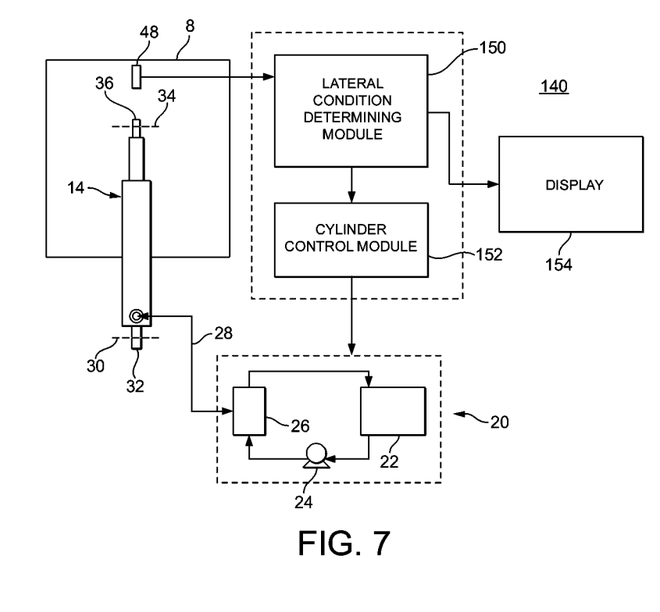
FIG. 7 schematically shows a second embodiment of a lateral condition determining system for determining the lateral condition of the hydraulic cylinder.

FIG. 7 shows a second embodiment of a lateral condition determining system 140 which is similar to the first embodiment. However, in the second embodiment there are no sensors mounted to the hydraulic cylinder 14. Instead, an inclination sensor 48 is provided which is mounted to the tipper body 8. The inclination sensor 48 is arranged such that it can measure the lateral inclination (i.e. side-to-side inclination) of the tipper body 8. The output of the inclination sensor 48 depends on both the lateral inclination and the lateral bending of the hydraulic cylinder 14. Therefore, the output of the inclination sensor 48 generates a signal relating to the lateral state of the hydraulic cylinder. As in the first embodiment, the lateral condition determining module 150 receives the output of the inclination sensor 48 and determines whether the lateral condition of the hydraulic cylinder 14 (and thus the tipper body 8 itself) is outside acceptable limits. If it is determined that the lateral condition of the cylinder 14 is outside acceptable limits then a warning may be displayed on the display 154 and tipping may be halted or the cylinder lowered using the cylinder control module 152. Providing an inclination sensor 48 on the tipper body 8 may be advantageous in that a single sensor can be used to provide an indication of cylinder inclination and bending.

It has been described above that if the lateral condition determining module 50 determines that the lateral condition of the cylinder 14 is outside acceptable limits then the tipping operation is stopped (i.e. movement of the tipper body 8 is halted), the tipper body 8 is returned to a resting position, and an alert is generated. However, in other embodiments only an alert is generated. Alternatively, in another embodiment movement of the tipper body 8 could be stopped, and the operator may need to manually lower the tipper body.

In the embodiment described above the lateral condition determining module 50 determines that the lateral condition of the hydraulic cylinder 14 is outside acceptable limits if the lateral inclination is above a threshold or the lateral bending is above a threshold. However, other ways of determining that the lateral condition of the hydraulic cylinder is outside acceptable limits could be used. For example, the lateral condition determining module 50 could determine that the lateral condition of the hydraulic cylinder 14 is unacceptable only if the inclination and the bending exceed thresholds. In other embodiments, the lateral condition of the hydraulic cylinder 14 could be determined as unacceptable based on a combination of the inclination and the bending being excessive (i.e. individually the inclination and bending are acceptable but in combination they present a risk). Further, the system 40 could be configured to model the hydraulic cylinder 14 and/or the tipper truck 1 based on the signals received.

It has been described that the inclination sensor 42 generates a signal representative of the lateral inclination of the hydraulic cylinder 14 by using an inclination sensor mounted to the cylinder 14. However, the lateral inclination of the hydraulic cylinder 14 could be monitored by using an inclination sensor mounted to the chassis 6 of the tipper measuring the sideways inclination β. It should be appreciated that any suitable sensors positioned in any appropriate location could be used to generate a signal indicative of or related to the lateral inclination of the hydraulic cylinder 14. Further, although it has been described that there are two bending sensors 44, 46, it should be appreciated that any suitable number of sensors could be used. For example, for a telescoping cylinder, one or more bending sensors could be attached to each stage of the cylinder.

It has been described that the lateral condition determining module 50 monitors both the lateral inclination and the lateral bending of the hydraulic cylinder 14. However, it should be appreciated that the module 50 may monitor only one of these conditions (e.g. only inclination or only bending). In other embodiments, the module 50 may monitor other conditions as well.

For example, in another embodiment a position sensor is provided to generate an angular positional parameter relating to the angular position (i.e. tip angle) of the tipper body 8. This could be in the form of an inclination sensor attached to the hydraulic cylinder 14 and capable of generating a fore-aft inclination parameter relating to the fore-aft inclination of the hydraulic cylinder (i.e. the inclination in a plane perpendicular to the pivot axes 30, 34 of the cylinder 14). Due to the fixed relationship between the inclination angle of the cylinder 14 and the tip angle of the tipper body 8 the output of the inclination sensor relates to the tip angle of the tipper body 8. In such an embodiment, the lateral condition determining module 50 would also monitor the angular positional parameter relating to the tip angle of the tipper body 8 and would determine whether the lateral condition of the cylinder is outside acceptable limits based on the lateral state parameters (e.g. lateral inclination parameter and/or lateral bending parameter), and the angular position parameter. For example, it may be possible to tolerate greater lateral bending/inclination at lower tip angles, whereas at a large tip angle (e.g. 50°) the lateral bending/inclination may have to be lower for the lateral condition of the cylinder to be within acceptable limits. In other words, for the same lateral bending/inclination the lateral determining module may determine that the lateral condition is excessive when at a high tip angle, but acceptable at a low tip angle.

In the embodiment described above the angular positional parameter is generated by an inclination sensor attached to the hydraulic cylinder 14. However, other suitable sensors could be used. For example, an inclination sensor could be attached to the tipper body 8 to measure the angular position of the tipper body. Further, a rotary position sensor could be used to measure the amount of rotation at either the pivot axis 10 of the tipper body 8, or the lower or upper pivot axes 30, 34 of the hydraulic cylinder 14. The signals generated by these sensors can all be related to the angular position of the tipper body (either with respect to the chassis 6 or horizontal). Further, a linear position sensor could be used to monitor the length of the hydraulic cylinder 14. Such a sensor could include a Hall effect sensor, for example. The signal generated by the linear position sensor could again be used to determine the angular position of the tipper body 8. In another arrangement, a distance sensor could be provided to measure the vertical distance between the frame and the lower front edge (i.e. the raised edge) of the tipper body 8. Such a sensor would generate an angular positional parameter as the output of the sensor relates to the angular position of the tipper body 8.

Further, in another embodiment a pressure sensor is provided to generate a pressure parameter relating to the pressure of the hydraulic fluid within the hydraulic cylinder 14. This could be in the form of a pressure sensor mounted to a port of the hydraulic cylinder 14. In such an embodiment, the lateral condition determining module 50 would also monitor the pressure parameter relating to hydraulic pressure within the hydraulic cylinder 14 (which relates to the load within the tipper body) and would determine whether the lateral condition of the cylinder is outside acceptable limits based on the lateral state parameters (e.g. lateral inclination parameter and/or lateral bending parameter), and the pressure parameter. For example, it may be possible to tolerate greater lateral bending/inclination at lower pressures (i.e. lower loads), whereas at a high pressure parameter (i.e. a high load) the lateral bending/inclination may have to be lower for the lateral condition of the cylinder to be within acceptable limits. In other words, for the same lateral bending/inclination the lateral determining module may determine that the lateral condition is excessive when at a high pressure parameter (high load), but acceptable at a low pressure parameter (low load).

Figure 8:
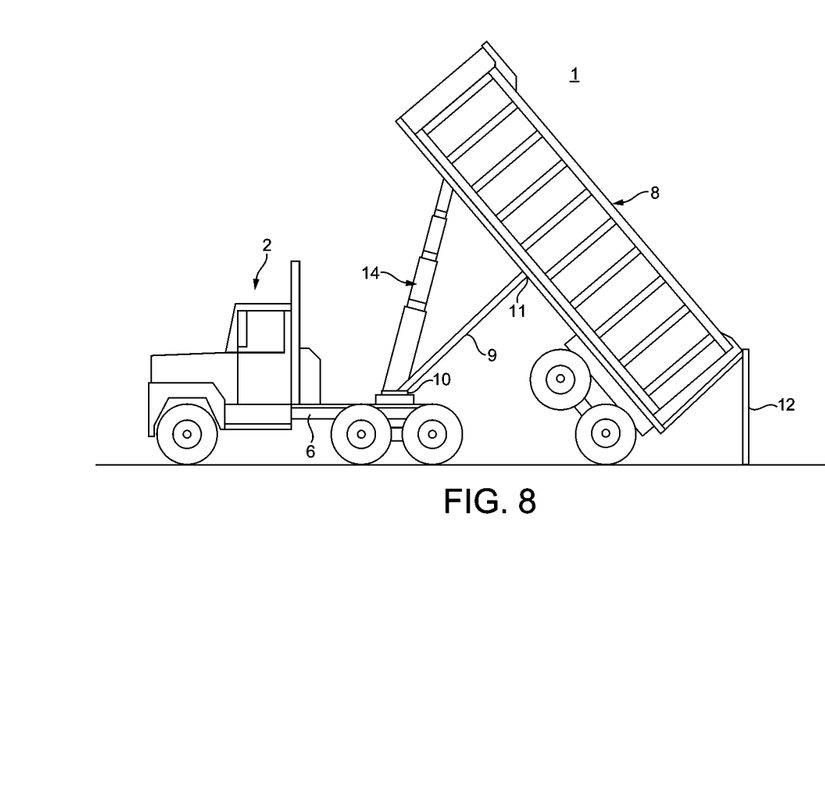
FIG. 8 schematically shows an alternative tipper truck.

It should be appreciated that the system could be used with any suitable type of tipper truck in which a tipper body 8 can be pivoted or moved by a hydraulic cylinder. For example, as shown in FIG. 8, the tipper truck 1 may comprises a tractor 2 having a frame 6 with a hydraulic cylinder 14 connected between the frame 6 and the tipper body 8. The tipper truck 14 further comprises a drawbar 11 that is pivotably connected at a first end to the frame 6 at a first pivot axis 10 and at a second end to the tipper body 8 at a second pivot axis 11. In order to pivot the tipper body 8 from a resting position (not shown) to the fully tipped position (FIG. 8), the hydraulic cylinder 14 is extended which causes the tipper body 8 to pivot clockwise (in FIG. 8) with respect to the frame 6 about the pivot axis 10, and with respect to the drawbar 9 about the pivot axis 11. It should also be appreciated that in order to measure the angular position (i.e. tip angle) of the tipper body 8 the inclination angle of the drawbar 9 could be measured since there is a fixed relationship between this angle and the tip angle (and the inclination angle of the hydraulic cylinder 14).

The lateral condition determining system 40 may be one of many intelligent systems that the tipper truck 1 is provided with and could therefore be combined with any suitable system for providing information regarding the tipper vehicle and/or the load carried by the tipper body. If multiple intelligent systems are provided, they may share the same display or processors, for example.

Some aspects of the above-described apparatus, system and methods, may be embodied as machine readable instructions such as processor control code, for example on a non-volatile carrier medium such as a disk, CD- or DVD-ROM, programmed memory such as read only memory (Firmware), or on a data carrier such as an optical or electrical signal carrier. For some applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). The code may be distributed between a plurality of coupled components in communication with one another. Where appropriate, embodiments may also be implemented using code running on a field-(re) programmable analogue array or similar device in order to configure analogue hardware.

For the avoidance of doubt, the present application extends to the subject-matter described in the following numbered paragraphs (referred to as "Para" or "Paras"):

A method of operating a tipper comprising a tipper body pivotably moveable with respect to a frame with a hydraulic cylinder disposed therebetween and actuatable to pivot the tipper body, the method comprising: receiving at least one lateral state parameter relating to at least one lateral state of the hydraulic cylinder; determining whether the lateral condition of the hydraulic cylinder is outside acceptable limits based on the at least one lateral state parameter; and generating an output if it is determined that the lateral condition of the hydraulic cylinder is outside acceptable limits.

A method wherein a lateral inclination parameter is received which relates to the lateral inclination of the hydraulic cylinder, and wherein it is determined whether the lateral condition of the hydraulic cylinder is outside acceptable limits based on at least the lateral inclination parameter.

A method wherein the lateral inclination parameter is generated by an inclination sensor arranged to measure the lateral inclination of the hydraulic cylinder.

A method wherein the inclination sensor is mounted to the hydraulic cylinder.

A method wherein the lateral inclination parameter is generated by an inclination sensor arranged to measure the lateral inclination of the tipper body.

A method wherein the inclination sensor is mounted to the tipper body.

A method wherein a lateral bending parameter is received which relates to the lateral bending of the hydraulic cylinder, and wherein it is determined whether the lateral condition of the hydraulic cylinder is outside acceptable limits based on at least the lateral bending parameter.

A method wherein the lateral bending parameter is generated by at least one bending sensor arranged to measure the lateral bending of the hydraulic cylinder.

A method wherein the bending sensor is mounted to the hydraulic cylinder.

A method wherein first and second bending sensors are mounted either side of the hydraulic cylinder.

A method wherein the or each bending sensor comprises a strain gauge.

A method further comprising receiving an angular positional parameter relating to the tip angle of the tipper body, wherein it is determined whether the lateral condition of the hydraulic cylinder is outside acceptable limits based on the at least one lateral state parameter and the angular positional parameter.

A method further comprising receiving a pressure parameter relating to the hydraulic pressure within the hydraulic cylinder, wherein it is determined whether the lateral condition of the hydraulic cylinder is outside acceptable limits based on the at least one lateral state parameter and the pressure parameter.

A method wherein the pressure parameter is generated by a pressure sensor which measures the hydraulic pressure within the hydraulic cylinder.

A method wherein the pressure sensor is mounted to the hydraulic cylinder.

A method wherein determining whether the lateral condition of the hydraulic cylinder is outside acceptable limits comprises comparing at least one lateral state parameter with reference data.

A method wherein determining whether the lateral condition of the hydraulic cylinder is outside acceptable limits comprises utilising an algorithm which considers at least two different types of lateral state parameter.

A method further comprising generating an alert if it is determined that the lateral condition of the hydraulic cylinder is outside acceptable limits.

A method wherein the alert comprises a visual and/or an audible alert.

A method further comprising preventing a tipping operation from being performed if it is determined that the lateral condition of the hydraulic cylinder is outside acceptable limits.

A method further comprising automatically halting a tipping operation if it is determined that the lateral condition of the hydraulic cylinder is outside acceptable limits.

A method further comprising automatically returning the tipper body to a resting position if it is determined that the lateral condition of the hydraulic cylinder is outside acceptable limits.

A system for a tipper comprising a tipper body pivotably moveable with respect to a frame with a hydraulic cylinder disposed therebetween and actuatable to pivot the tipper body, the system comprising: a lateral condition determining module arranged to: receive at least one lateral state parameter relating to at least one lateral state of the hydraulic cylinder; determine whether the lateral condition of the hydraulic cylinder is outside acceptable limits based on the at least one lateral state parameter; and generate an output if it is determined that the lateral condition of the hydraulic cylinder is outside acceptable limits.

A system wherein the lateral condition determining module is arranged to: receive a lateral inclination parameter relating to the lateral inclination of the hydraulic cylinder, and determine whether the lateral condition of the hydraulic cylinder is outside acceptable limits based on at least the lateral inclination parameter.

A system further comprising an inclination sensor arranged to measure the lateral inclination of the hydraulic cylinder and generate the lateral inclination parameter.

A system further comprising an inclination sensor arranged to measure the lateral inclination of the tipper body and generate the lateral inclination parameter.

A system wherein the lateral condition determining module is arranged to: receive a lateral bending parameter relating to the lateral bending of the hydraulic cylinder, and determine whether the lateral condition of the hydraulic cylinder is outside acceptable limits based on at least the lateral bending parameter.

A system further comprising at least one bending sensor arranged to measure the lateral bending of the hydraulic cylinder and generate the lateral bending parameter.

A system further comprising first and second bending sensors arranged to be mounted either side of the hydraulic cylinder.

A system wherein the or each bending sensor comprises a strain gauge.

A system wherein the lateral condition determining module is arranged to: receive an angular positional parameter relating to the tip angle of the tipper body; and determine whether the lateral condition of the hydraulic cylinder is outside acceptable limits based on the at least one lateral state parameter and the angular positional parameter.

A system wherein the lateral condition determining module is arranged to: receive a pressure parameter relating to the hydraulic pressure within the hydraulic cylinder; and determine whether the lateral condition of the hydraulic cylinder is outside acceptable limits based on the at least one lateral state parameter and the pressure parameter.

A system further comprising a pressure sensor which is arranged to measure the hydraulic pressure within the hydraulic cylinder and generate the pressure parameter.

A system further comprising a storage module storing reference data, and wherein the lateral condition determining module is arranged to determine whether the lateral condition of the hydraulic cylinder is outside acceptable limits by comparing at least one lateral state parameter with reference data stored in the storage module.

A system wherein the lateral condition determining module is arranged to determine whether the lateral condition of the hydraulic cylinder is outside acceptable limits by utilising an algorithm which considers at least two different types of lateral state parameter.

A system further comprising an alert generator arranged to generate an alert if it is determined that the lateral condition of the hydraulic cylinder is outside acceptable limits.

A system wherein the alert generator comprises a visual and/or an audible alert generator.

A system further comprising a cylinder control module arranged to prevent a tipping operation from being performed if it is determined that the lateral condition of the hydraulic cylinder is outside acceptable limits.

A system further comprising a cylinder control module arranged to automatically halt a tipping operation if it is determined that the lateral condition of the hydraulic cylinder is outside acceptable limits.

A system further comprising a cylinder control module arranged to automatically return the tipper body to a resting position if it is determined that the lateral condition of the hydraulic cylinder is outside acceptable limits.

A tipper comprising: a tipper body pivotably moveable with respect to a frame; a hydraulic cylinder disposed between the frame and the tipper body and actuatable to pivot the tipper body; and a system A tipper wherein the inclination sensor is mounted to the hydraulic cylinder.

A tipper wherein the inclination sensor is mounted to the tipper body.

A tipper wherein the bending sensor is mounted to the hydraulic cylinder.

A tipper wherein the first and second bending sensors are mounted either side of the hydraulic cylinder.

A tipper wherein the pressure sensor is mounted to the hydraulic cylinder.

A hydraulic cylinder assembly comprising: a hydraulic cylinder having at least one pivot axis perpendicular to the longitudinal axis of the cylinder; and one or more of the following: at least one inclination sensor coupled to the hydraulic cylinder such that it is capable of generating a lateral inclination parameter relating to the inclination of the cylinder in a plane parallel to the pivot axis; and/or at least one inclination sensor coupled to the hydraulic cylinder such that it is capable of generating a fore-aft inclination parameter relating to the inclination of the cylinder in a plane perpendicular to the pivot axis; and/or at least one bending sensor coupled to the hydraulic cylinder such that it is capable of generating a lateral bending parameter relating to the inclination of the cylinder in a plane parallel to the pivot axis and the longitudinal axis.

A hydraulic cylinder assembly wherein first and second bending sensors are mounted either side of the hydraulic cylinder.

A hydraulic cylinder assembly wherein the or each bending sensor comprises a strain gauge.

A hydraulic cylinder assembly wherein at least one end of the hydraulic cylinder is provided with an eye which defines the pivot axis.

The invention claimed is:

1. A method of operating a tipper comprising a tipper body pivotably moveable with respect to a frame with a hydraulic cylinder disposed therebetween and actuatable to pivot the tipper body, the method comprising:
   receiving at least a lateral bending parameter relating to at least a lateral bending of the hydraulic cylinder;
   determining whether a lateral condition of the hydraulic cylinder is outside acceptable limits based on the at least the lateral bending parameter; and
   generating an output if it is determined that the lateral condition of the hydraulic cylinder is outside acceptable limits.

2. A method according to claim 1, wherein a lateral inclination parameter is received which relates to a lateral inclination of the hydraulic cylinder, and wherein it is determined whether the lateral condition of the hydraulic cylinder is outside acceptable limits based on at least the lateral inclination parameter.

3. A method according to claim 2, wherein the lateral inclination parameter is generated by an inclination sensor arranged to measure the lateral inclination of the hydraulic cylinder.

4. A method according to claim 3, wherein the inclination sensor is mounted to the hydraulic cylinder.

5. A method according to claim 2, wherein the lateral inclination parameter is generated by an inclination sensor arranged to measure the lateral inclination of the tipper body.

6. A method according to claim 5, wherein the inclination sensor is mounted to the tipper body.

7. A method according to claim 1, further comprising receiving an angular positional parameter relating to a tip angle of the tipper body, wherein it is determined whether the lateral condition of the hydraulic cylinder is outside acceptable limits based on the at least one lateral state parameter and the angular positional parameter.

8. A method according to claim 1, further comprising receiving a pressure parameter relating to a hydraulic pressure within the hydraulic cylinder, wherein it is determined whether the lateral condition of the hydraulic cylinder is outside acceptable limits based on at least one lateral state parameter of the hydraulic cylinder and the pressure parameter.

9. A method according to claim 8, wherein the pressure parameter is generated by a pressure sensor which measures a hydraulic pressure within the hydraulic cylinder.

10. A method according claim 1, further comprising generating an alert if it is determined that the lateral condition of the hydraulic cylinder is outside acceptable limits.

11. A system for a tipper comprising a tipper body pivotably moveable with respect to a frame with a hydraulic cylinder disposed therebetween and actuatable to pivot the tipper body, the system comprising:
    a lateral condition determining module arranged to:
    receive at least one lateral state parameter relating to at least a lateral bending state of the hydraulic cylinder;
    determine whether the lateral condition of the hydraulic cylinder is outside acceptable limits based on the at least one lateral state parameter; and
    generate an output if it is determined that the lateral condition of the hydraulic cylinder is outside acceptable limits.

12. A system according to claim 11, wherein the lateral condition determining module is arranged to:
    receive a lateral inclination parameter relating to a lateral inclination of the hydraulic cylinder, and
    determine whether the lateral condition of the hydraulic cylinder is outside acceptable limits based on at least the lateral inclination parameter.

13. A system according to claim 12, further comprising an inclination sensor arranged to measure the lateral inclination of the hydraulic cylinder and generate the lateral inclination parameter.

14. A system according to claim 12, further comprising an inclination sensor arranged to measure the lateral inclination of the tipper body and generate the lateral inclination parameter.

15. A system according to claim 11, wherein the lateral condition determining module is arranged to:
    receive an angular positional parameter relating to a tip angle of the tipper body; and
    determine whether the lateral condition of the hydraulic cylinder is outside acceptable limits based on the at least one lateral state parameter and the angular positional parameter.

16. A system according to claim 11, wherein the lateral condition determining module is arranged to:
  receive a pressure parameter relating to a hydraulic pressure within the hydraulic cylinder; and
  determine whether the lateral condition of the hydraulic cylinder is outside acceptable limits based on the at least one lateral state parameter and the pressure parameter.

17. A system according to claim 11, further comprising an alert generator arranged to generate an alert if it is determined that the lateral condition of the hydraulic cylinder is outside acceptable limits.

18. A tipper comprising:
  a tipper body pivotably moveable with respect to a frame;
  a hydraulic cylinder disposed between the frame and the tipper body and actuatable to pivot the tipper body; and
  a system in accordance with claim 11.

\* \* \* \* \*